United States Patent [19]

Nase et al.

[11] Patent Number: 4,863,111
[45] Date of Patent: Sep. 5, 1989

[54] FILM REEL WITH FILM-THREADING TENSIONING FLANGE

[76] Inventors: Michael Nase, 2512 Leslie St.; Frank Nase, 476 Clark Pl., both of Union, N.J. 07083

[21] Appl. No.: 268,289

[22] Filed: Nov. 7, 1988

Related U.S. Application Data

[63] Continuation-in-part of Ser. No. 118,654, Nov. 9, 1987, Pat. No. 4,798,352.

[51] Int. Cl.[4] .................. B65H 75/28; B65H 75/18
[52] U.S. Cl. ............................ 242/74; 242/68.5; 242/71.8; 242/78.3
[58] Field of Search .............. 242/68.1, 68.3, 68.5, 242/71.8, 74, 74.1, 78.3

[56] References Cited

U.S. PATENT DOCUMENTS

| | | | |
|---|---|---|---|
| 2,954,941 | 10/1960 | Hultgren | 242/74 |
| 3,351,298 | 11/1967 | Taesler et al. | 242/74.1 |
| 3,357,653 | 12/1967 | Otsuka | 242/74 |
| 3,361,380 | 1/1968 | Mizutani | 242/74 |
| 3,648,944 | 3/1972 | Fujiwara et al. | 242/74 |
| 3,675,869 | 7/1972 | Grant | 242/74 |
| 3,743,204 | 7/1973 | Hertel | 242/68.5 |
| 3,982,709 | 9/1976 | Hertel | 242/74 |
| 4,540,134 | 9/1985 | Schankler | 242/74 |
| 4,629,140 | 12/1986 | La Casse | 242/71.8 |

Primary Examiner—John Petrakes
Attorney, Agent, or Firm—William T. Hough

[57] ABSTRACT

In a preferred embodiment, there is a film reel having a film-threading film-retaining core, the core containing free-space for threading a mounting-end of a film to be would on the reel, and across at least a portion of the core's free space there being a floor mounting the outer reel structure onto the inner core structure that is mountable on a driving spindle, with spaced-apart posts extending upwardly from the floor and the posts being spaced from each of the mounting spaces inside core walls and the space's inside surface of the outside walls of the core, with each of the posts anchored by anchoring structure connected to the core's inside core structure, the upwardly extending posts having a large exaggerated arcuate surface providing large surface area for contact with film threaded thereagainst, there being a flange extending angularly radially inwardly from the inside surface of the outside wall of the core, the flange extending between second and third posts and extending radially inwardly sufficiently to press against the threaded film when threaded within the threading space of the core such that the pressed threaded film is held tautly.

4 Claims, 4 Drawing Sheets

FILM REEL WITH FILM-THREADING TENSIONING FLANGE

This application is a continuation-in-part of the same inventors' U.S. Ser. No. 118,654 filed Nov. 9, 1987, now U.S. Pat. No. 4,798,352, and is directed to an improved film anchoring impovement.

BACKGROUND TO THE INVENTION

Prior to the present invention, there have existed a number of different types of film reels having various configurations in the core structures for the threading and retaining of the mountable end of a film to be reeled onto the reel. Typical ones of such patents are as follow. There is Taesler et al. U.S. Pat. No. 3,351,298 granted Nov. 7, 1967 in which a movable wedge-post may be turned within threading space in order to wedge the film in a vise-like manner against an inner surface of the outer wall structure of the core. Also, there is the Hertel U.S. Pat No. 3,746,204 in which the inner core has an outwardly extending projection against which all of the film being wound on the core presses thereagainst in order to secure the loose end of the film being wound onto the reel, being granted July 3, 1973. Also there is Grant U.S. Pat. No. 3,675,869 granted July 11, 1972 which discloses a core's radially-extending wall having transverse spaced-apart grooves therein through which the ends of the film is threaded through one and then sequentially through another one thereof. Also there is Fujiwara et al. U.S. Pat. No. 3,648,944 granted Mar. 14, 1972 discloses a core free-space having a loose cylindrical member which when a film is wrapped therearound, serves to become wedged radially outwardly to prevent withdrawal of the film during use. Hultgren U.S. Pat. No. 2,954,941 granted Mar. 4, 1960 discloses a threading space having a single post therein through which film is threaded into the threading space around the reverse-direction post and back outwardly to be pressed by other reeled-on portions of the film against the free-end thereby locking the free-end against the outer-core surface of the reel. Also there is Hertel U.S. Pat. No. 3,982,709 that discloses a core-threading space having a reverse-direction upwardly extending post therein around which the film is threaded and carried in the reverse direction, in order to bind the surface thereof against the inner core outwardly facing wall. Also there is the Schankler U.S. Pat. No. 4,540,134 granted Sep. 10, 1985 that discloses a film reel having film-threadable space in which it is required that inwardly-directed posts inwardly-directed from the inner surface of the outer core wall opposes squared right-angular points of the inner core wall, with small spaces defined therebetween, and having also an upwardly extending reverse-direction post such that the film is threadable through the free space and the narrow spaces and around the reverse-direction post and back again through the spaces adjacent the right-angle corners to thereby eventually anchor the film-end.

A number of problems and disadvantages arise from the structures and arrangements of the prior art typically represented by the above-noted patents such as follow. Time is a valuable commodity for persons and companies constituting industry that utilize the film reels of the type to which this invention and the above-noted prior art are directed, such that narrow passages and complicated configurations and/or arrangements requiring time-consuming care and caution in the threading thereof are not only economically unfeasible, but practically worthless because no one in industry wants to nor will use them.

Also a common misconception is that the film-end retaining ability of a core is directly proportional to a major degree to a number of different configurations and grooves through which the film has to be threaded. In fact, in actual parctice, such does not prove to be true, the film end in a number of instances not being securely anchored—which in turn results in improper or faulty drawing or winding of the feed-film during the process of the reel-mounting of the film during its use from a feed-reel.

In order to achieve certain purported film-threading and film-anchoring advantages, there is considerable free space between inner and outer core wall structures, resulting in a common problem of likelihood of shearing of the outer reel structure from the inner core structure mounted on a winding spindle because of the major amount of torque imparted by the driven spindle driving the inner core structure, as compared to inertia of the outer reel structure that is pulling onto the reel the anchored film.

It has moreover been recently discovered that for computer-utilized reels, for example, on which the film is repeatedly run back and forth to and from the mounted end thereof, the sudden and repeated alternate forward and reverse actions of or on the reel results in a buckling or kick-back on the end-portion of the film that is threaded retainably within the core of the reel, with a result of the threaded film-end working-loose and eventually becoming disengaged from the reel core.

OBJECTS

Objects of the present invention are directed to overcoming or avoiding one or more difficulties and/or disadvantages of the afore-stated prior art patents and technology thereof.

More particularly, another object is to obtain a novel film-mounting reel having a novel core-embodying reel embodying structure that enables speedy and secure anchoring of the free-end of the film wound or to be wound on the reel.

Another object of the invention is to enhance the film-end anchoring characteristics of a core of a film-reel having large and spacious threading characteristics for the free-end of the film, and having concurrently a high resistance of torque by virtue of improved structure and strength of the core.

Another object is to deter and/or avoid kick-back of the film-end threaded within the core of the reel, in order to obviate the loosening and/or accidental releasing of the anchored film.

Another object is to obtain an improved core structure making the film reel adaptable for use on a variety of diverse different shaped spindles.

Another object is to obtain one or more of the aforementioned objects, while concurrently allowing the use of a conventional wedge as an anchoring mechanism alone or as an accessory, further anchoring the film end of the film to be wound onto the reel.

SUMMARY OF THE INVENTION

Broadly the invention may be defined as an improved film reel as an improved combination. The basic film reel to which the improvement is directed has a film-threadable film-retaining core with spaced-apart outer and inner collars defining a free-space between the radially outwardly-positioned wall of the inside collar and the radially inwardly-positioned wall of the outside collar. The free-space communicates with a slot in the outer reel structure such that a film-end of a film to be wound on the reel may be threaded into the free-space of the core. The inner and outer collars of the core are interconnected by a floor on a lower side of the reel, and an opposite upper side of the reel being open with regard to a film free-end that must be threaded into the free-space with regard to the anchoring thereof. Also, between the core inner and outer collars, there is an interconnecting readially-extending wall or (collar's film-anchoring floor) which anchors the outer collar to the inner collar; this provides at least some minor degree of reinforcing strength to avoid the stripping of the outer collar from the inner collar during use as a result of excessive torque during the winding of the film onto the film reel as driven by a driving spindle on which the film reel would be mounted. The prior art film reel has a communicating slot connecting the threadable free-space with a space in which the film will be wound around the outer collar of the reel, the slot extending radially-outwardly the entire radial width of the reel's outer flange, enabling such maneuvering to be achieved. At the vertex or center of the core, there is a spindle-mounting space on the reel's lower surface, formed and shaped to receive and lock-in a driving spindle on which the reel will be driven in order to draw film onto the reel around the outer collar's radially outwardly-positioned outer surface. There are a plurality of wall structures spaced-apart from one-another and each extends radially outwardly a predetermined distance sufficient to produce a major tension on the threaded film, each radially-extending wall of the plurality ending in a wall structure distal end leaving a narrow film-threading gap between that distal end and the outer collar's radially inwardly-positioned wall surface. There is also the conventional reverse-of-direction posts at the end of the free-space for threading around to cause the film end to be overlapped and held by the previously threaded film, when the threaded film is tightened. The present improvement is directed as preventing the above-noted kick-back in the film end, and such is accomplished by having a radially-inwardly extending flange mounted on the inner surface of the outer collar, pressing the flange's distal end radially inwardly against the threaded film as the threaded films extends between the above-noted plurality of wall structures with their preferred enlarged outer ends. The flange must extend a sufficient distance radially inwardly as to intercept and press the threaded film inwardly sufficiently to thereby make the threaded film more taut than heretofore has been the case, resulting in a preventing of back-lash or kick-back. Accordingly, loosening of the end of the threaded tap is averted.

In a preferred embodiment, the flange extends radially inwardly at an angle with the flange distal end extending angularly in a counter-clockwise direction—i.e. toward the end of the threading space, toward the reverse-of-direction post, achieving improved anchoring.

Preferably the flange is mounted such that its position will be between the second and third film-anchoring posts above-described, with the result of better-binding the overlapped end that is overlapped with the first-threaded portion as illustrated in the figures, for various embodiments. However, in other embodiments, the flange—or additional flanges—may also exist such as between the first and second film-anchoring posts.

As in the parent application for patent above-noted, there may optionally be key-receiving structures forming key-receiving spaces providing mechanism for the locking-in of the driving spindle; alternatively, also as exhibited in the patent application, there may be an irregular shape of the spindle-receiving female structure and space thereof, making a key-receiving space optional, although the preferred additional presence thereof reduces shearing stress on the formed irregularly-shaped structure. In conventional manner, the key-receiving structure and space thereof, and/or spindle-receiving regular or irregularly-shaped spindle-receiving structure(s) are located on an opposite face of the reel, as compared to the film-retaining and locking structure above-discussed.

The angular preferred position above-noted, defines an angle of less than 90 degrees, typically of about 45 degrees more or less.

The invention may be better understood by making reference to the following illustrative figures.

THE FIGURES

FIG. 1 diagrammatically and symbolically illustrates side view of a threading-side of a reel of a preferred reel of this improvement invention, with partial cut-away for improved understanding and also with a partial cut-away illustrating the reel-flange of the opposite side, and in phantom showing the path of a threaded film or tape. This embodiment includes a single perpendicularly radially-inwardly film-contacting flange positioned between the second and third sequentially-arranged radially outwardly-extending wall structures and their respective enlarged rounded distal ends thereof, positioned within the reel-flange film-threading space.

FIG. 2 diagrammatically and symbolically illustrates a side view of an alternate embodiment (as compared to FIG. 1) of a threading-side of a reel of another preferred reel of this invention, with partial cut-away for improved understanding and also with a partial cut-away illustrating the reel-flange of the opposite side, and in phantom showing the path of a threaded film or tape. This embodiment includes a single angularly-extending radially-inwardly film-contacting flange positioned between the second and third sequentially-arranged radially outwardly-extending wall structures and their respective enlarged rounded distal ends thereof, positioned within the reel-flange film-threading space.

FIG. 3 diagrammatically and symbolically illustrates an opposite side view of each of the embodiments of reels of FIGS. 1 and 2, with partial cut-away showing the opposite side's reel flange, and in further cut-away showing the opposite-side's threading structure with it threaded film or tape shown in phantom. This illustrated side illustrates especially the nature of the mounting structure mountable on and drivable by a conventional elongated driving shaft or spindle.

FIG. 4A diagrammatically and symbolically illustrates an alternate other embodiment, illustrating a side view of a threading-side of this reel with partial cut-away for improved understanding and with a partial cut-away showing the opposite side's reel-flange, and showing in phantom threaded film or tape. This embodiment includes a two radially-inwardly extending film-contacting flanges, one angularly-extending flange and one perpendicularly extending flange; the angularly-extending radially-inwardly film-contacting flange is positioned between the second and third sequentially-arranged radially outwardly-extending wall structures and their respective enlarged rounded distal ends thereof, and the perpendicularly-extending radially-inwardly film-contacting flange positioned between the first and second sequentially-arranged radially outwardly-extending wall structures and their respective enlarged rounded distal ends thereof, positioned within the reel-flange film-threading slot.

FIG. 4B diagrammatically and symbolically illustrates an opposite side view of the reel illustrated in FIG. 4A, with partial cut-away for improved understanding and with a partial cut-away showing the opposite side's reel flange. This illustrated side illustrates especially the nature of the mounting structure mountable on and drivable by a conventional elongated driving shaft or spindle.

FIG. 5 diagrammatically and symbolically illustrates the shaft or spindle-driven side of another alternate reel of the same general type as the foregoing figures, showing the alternate configuration of the spindle-mounting structure and illustrating in partial cut-away for improved understanding, and with a partial cutaway showing the opposite side's reel flange.

FIG. 5A diagrammatically and symbolically illustrates a threading-side of an alternate reel with partial cut-away for improved understanding and with a partial cut-away showing the opposite side's reel-flange, showing in phantom a threaded film or tape. The spindle-mounting structure of this embodiment has forms a squared spindle-receiving hole or cavity, thus drivable by a spindle devoid of a radially-extending key-receiving structure (and space thereof) of the type illustrated in FIG. 1. This alternate illustrated reel has an opposite side identical to that shown in FIG. 5. This embodiment includes a single angularly-extending radially-inwardly film-contacting flange positioned between the first and second sequentially-arranged radially outwardly-extending wall structures and their respective enlarged rounded distal ends thereof, positioned within the reel-flange film-threading space.

FIG. 5B diagrammatically and symbolically illustrates an embodiment different from that of FIG. 5A, and illustrates a threading-side of an alternate reel with partial cut-away for improved understanding and with a partial cut-away showing the opposite side's reel-flange, showing in phantom a threaded film or tape. The spindle-mounting structure of this embodiment has forms a squared spindle-receiving hole or cavity, thus drivable by a spindle devoid of a radially-extending key-receiving structure (and space thereof) of the type illustrated in FIG. 1. This alternate illustrated reel has an opposite side identical to that shown in FIG. 5. This embodiment includes a single angularly-extending radially-inwardly film-contacting flange positioned between the second and third sequentially-arranged radially outwardly-extending wall structures and their respective enlarged rounded distal ends thereof, positioned within the reel-flange film-threading space.

DETAILED DESCRIPTION

For the various embodiments discussed and illustrated above, all have common similarities in the reel structures thereof, and accordingly for corresponding elements related indicia are utilized to facilitate understanding, and once described for one embodiment, a description is not repeated for other embodiments except to add clarification of understanding, and/or to point out existing differences.

Figure 1:
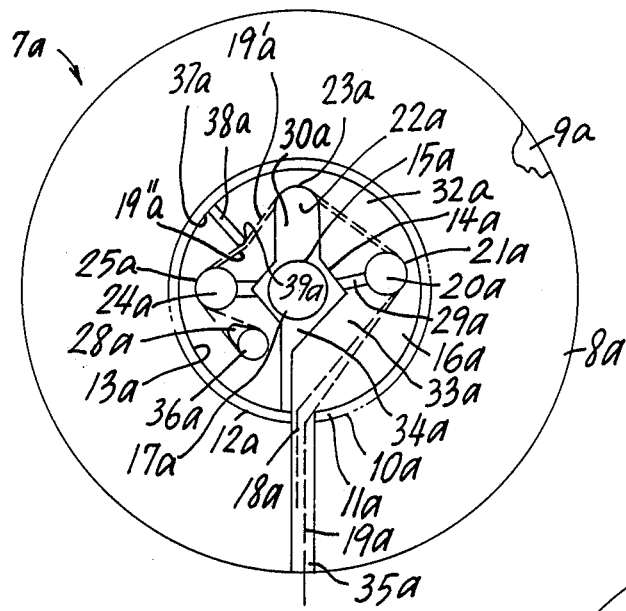

With regard to FIG. 1, there is disclosed the reel 7a having an upper flange 8a and a lower flange 9a, and having an outer collar 10a inclusive of the outer collar wall structure 11a having the radially outwardly extending surface 12a onto which the film is wound, and having the inner wall surface 13a thereof. There is also disclosed the inner collar radially outwardly positioned outer surface 14a, and the radially positioned surface 15a. The radially inwardly positioned wall surface 15a circumscribes and forms the spindle-receiving receptacle space 17a. The inner and outer collars are interconnected by the lower collar's-anchoring floor 32a above which is defined a threading-space 16a through which a loose end of a film is threaded prior to reeling a film onto the film reel. As is the case with particular prior art reels, the floor 32a does not extend the entire distance of the threading space, but becomes terminated in the vicinity of the core threading-groove 18a that continues as flange threading-groove 35a through which the free end of film 19a is threaded. At the termination point of the floor 32a at the lower face of the reel, there is a through-space 33a that in the past has been typically that in the past has been typically utilized for insertion of a separate pin or key so as to lock a film into the core. There optionally is included the presence or absence of through-space in the floor 32a, that provides optional use additionally of a prior art separate pin for additional locking of the film into the inner threading space of the core—although for the present improved invention, it is highly unlikely that such additional separate pin would be needed nor would serve any useful purpose.

Accordingly a free-end of the film 19a (shown in phantom) may be threaded through the space 35a, through the gap 18a and through the threading-space 16a.

Extending upwardly from the floor 32a, are separate radially outwardly extending walls 29a, 30a, and 31a of which the distal ends 20a, 22a and 24a are preferably at least arcuately formed distal ends therof, having convex surfaces on the radially-outwardly faces thereof as convex surfaces 21a, 23a and 25a. The inner collar radially outwardly positioned wall 14a is formed in this embodiment in a square shape, forming the consecutive sides between the squared corners thereof, and the respective radially-outwardly extending walls 29a, 30a and 31a extend from intermediate portions of those consecutively occuring walls. Additionally there is the reverse-direction post 28a having a supporting wall 31a around which it is shown the film 19a terminating in film-end portion 36a wrapped around reverse-of-direction post 27a and reverse-threaded in reverse-direction over the surface 25a. The inner core structure of wall 14a is anchored to the outer core collar 10a by the interconnecting wall structure 34a.

For the above-described basic structure of FIG. 1, as the present improved invention there is diagrammatically and symbolically for this side view of a threading-side of a reel of a preferred reel of this improvement invention, a single perpendicularly radially-inwardly film-contacting flange 38a extending radially inwardly from and substantially perpendicularly to inner wall surface 13a from the location 37a with the film-contacting perpendicularly-positioned radially inwardly-extending flange 38a positioned between the second and third sequentially-arranged radially outwardly-extending wall structures 30a and 31a, and their respective enlarged rounded distal ends 22a and 24a thereof, positioned within the reel-flange film-threading space 16a. The perpendicular inwardly-extending flange 38a extends radially inwardly a distance sufficient to intersect an imaginary line extending from radially outwardly-most rounded surfaces 23a and 25a, such that when the film 19a is tautly threaded in respective counter-clockwise forward direction and tautly threaded as shown in reverse clockwise direction between the surface 23a and 25a, a distal end of the radially inwardly-extending flange is depressingly pressed against the film (or tape) outerwardly-positioned suface at point (location) 39a. As a result of the pressure of the angularly-positioned radially inwardly-extending flange 38a on the overlapped film (overlapping itself in the alternate forward and reverse-directions of threading) tautly pressing downwardly on the thusly-locked film-end of film 19a, the film does not become loosened over extended periods of use during which the film 19a is exerted to repeated intermittent jerks and shocks of pulling and potential loosening during alternate forward and reverse windings of films during conventional use of the reel. The presence of this radially inwardly-extending flange 38a positioned as above-described prevents disrupting lash-backs of the film or tape, in contrast to prior problems discussed-above.

Figure 2:
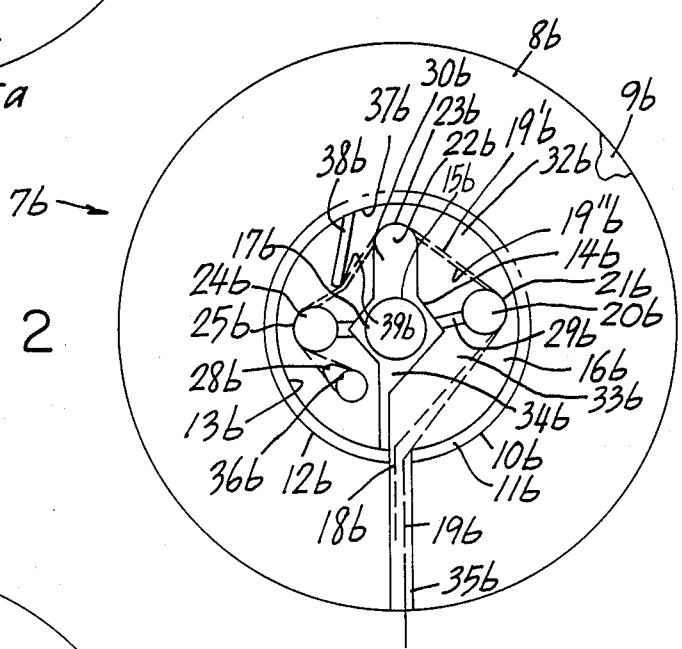

For the above-described basic structure of FIG. 2, as the present improved invention there is diagrammatically and symbolically for this side view of a threading-side of a reel of a preferred reel of this improvement invention, a single angularly-positioned radially-inwardly film-contacting flange 38b extending radially inwardly from and substantially perpendicularly to inner wall surface 13b from the location 37b with the film-contacting angularly-positioned flange 38b positioned between the second and third sequentially-arranged radially outwardly-extending wall structures 30b and 31b, and their respective enlarged rounded distal ends 22b and 24b thereof, positioned within the reel-flange film-threading space 16b. The inwardly-extending flange 38b extends radially inwardly a distance sufficient to intersect an imaginary line extending from radially outwardly-most rounded surface 23b and 25b, such that when the film 19b is tautly threaded in respective counter-clockwise forward direction and tautly threaded as shown in reverse clockwise direction between the surfaces 23b and 25b, a distal end of the radially inwardly-extending flange is depressingly pressed against the film (or tape) outerwardly-positioned surface at point (location) 39b. As a result of the pressure of the radially inwardly-extending flange 38b on the overlapped film (overlapping itself in the alternate forward and reverse-directions of threading) tautly pressing downwardly on the thusly-locked film-end of film 19b, the film does not become loosened over extended periods of use during which the film 19b is exerted to repeated intermittent jerks and shocks of pulling and potential loosening during alternate forward and reverse windings of films during conventional use of the reel. The presence of this radially inwardly-extending flange 38b positioned as above-described prevents disrupting lash-backs of the film or tape, in contrast to prior problems discussed-above.

Figure 3:
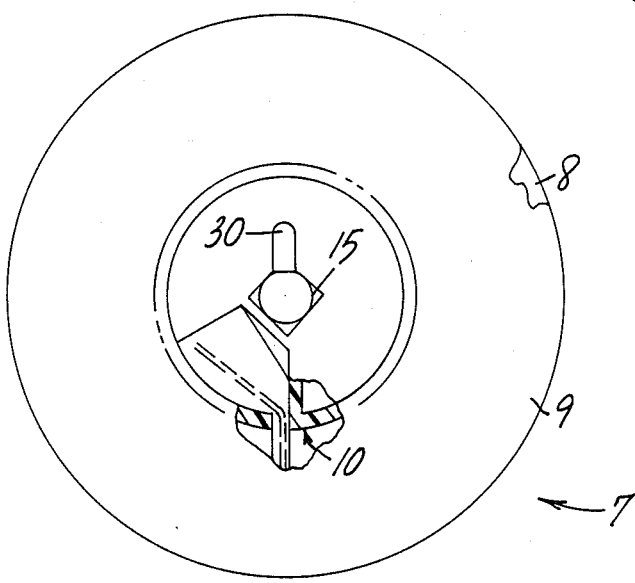

As noted-above, the FIG. 3 diagrammatically and symbolically illustrates an opposite side view of each of the embodiments of reels of FIGS. 1 and 2, with partial cut-away showing the opposite side's reel flange 9, and in further cut-away showing the opposite-side's threading structure of the inner collar and of the reel flange 8, with the flim 19 threaded as shown in phantom. This illustrated side illustrates especially the nature of the diamond-shaped mounting structure (and dirving-spindle receptacle thereof) mountable on and drivable by a conventional elongated driving shaft or spindle that has either an irregular or round cross-section and/or that has a conventional driving-key extending from the driving spindle's lateral surface, this spindle-mounting structure including structure defining (forming) a key-receiving radially-outwardly-extending groove receivable of a conventional or desired spindle-key above-noted.

Figure 4A:
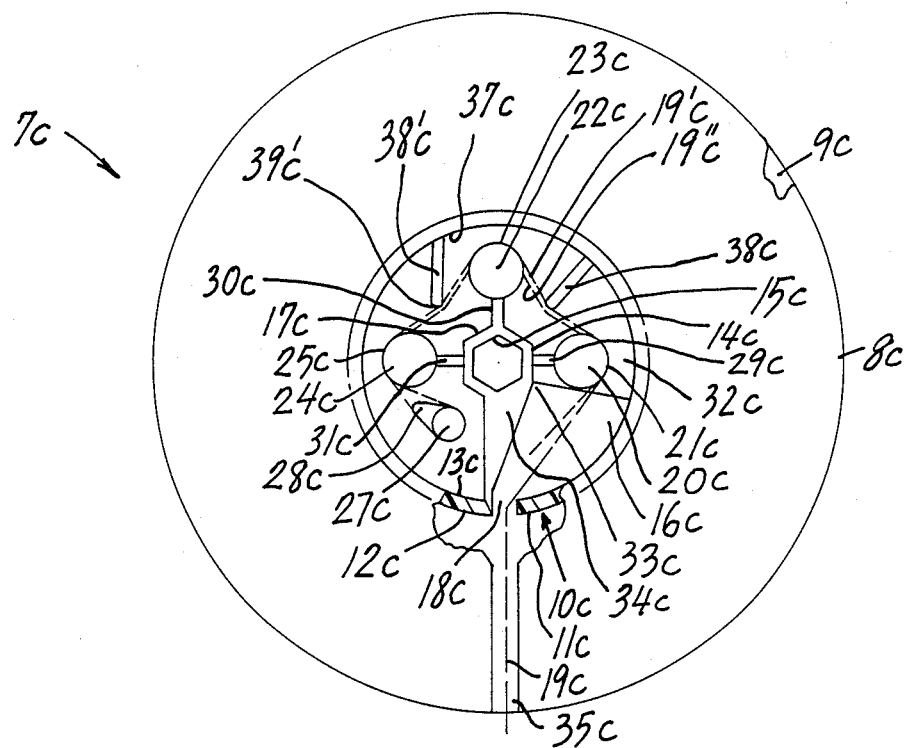

FIG. 4A diagrammatically and symbolically illustrates an alternate other embodiment, illustrating a side view of a threading-side of this reel 7c with partial cut-away for improved understanding and with a partial cut-away showing the opposite side's reel-flange 9c, and showing in phantom threaded film or tape 19c. This embodiment includes a two radially-inwardly extending film-contacting flanges, one angularly-extending flange 38'c and one perpendicularly extending flange 38c; the angularly-extending radially-inwardly film-contacting flange 38'c is positioned between the second and third sequentially-arranged radially outwardly-extending wall structures 30c and 31c and their respective engarged rounded distal ends 22c and 24c thereof. The perpendicularly-extending radially-inwardly film-contacting flange 38 is positioned between the first and second sequentially-arranged radially outwardly-extending wall structures 29c and 30c and their respective enlarged rounded distal ends 21c and 23c thereof, within the reel-flange film-threading space 16c.

Figure 4B:
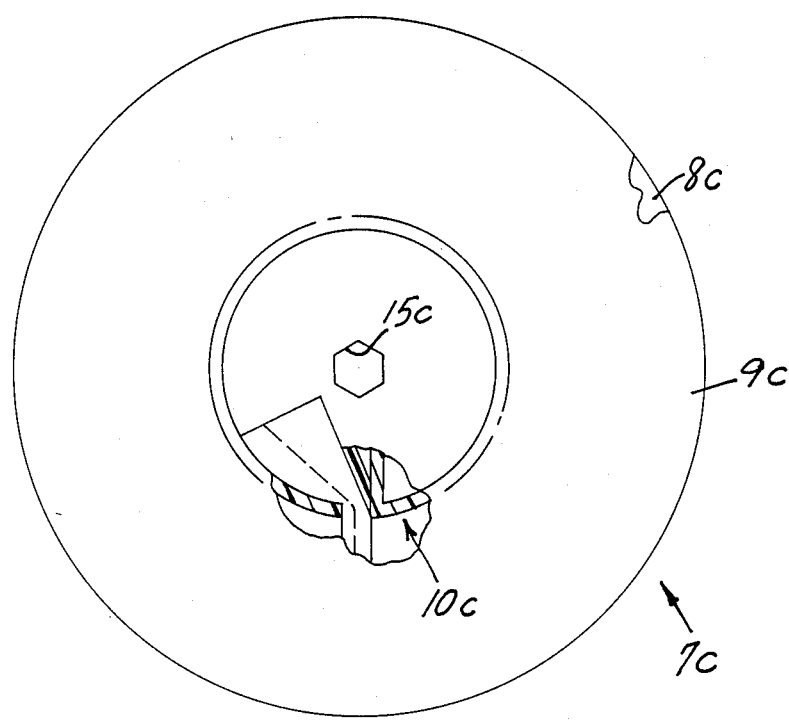

FIG. 4B diagrammatically and symbolically illustrates an opposite side view of the reel illustrated in FIG. 4A, with partial cut-away for improved understanding and with a partial cut-away showing the opposite side's reel flange 8c. This illustrated side illustrates especially the nature of the hexagonally-shaped mounting structure mountable on and drivable by a conventional elongated driving shaft or spindle of irregular (not round) cross-section or by a shaft or spindle of any cross-sectional shape that includes a radially-outwardly-extending key that would wedge within one of the corners of the hexagonally-shaped spindle-receiving structure (and space thereof).

Figure 5:
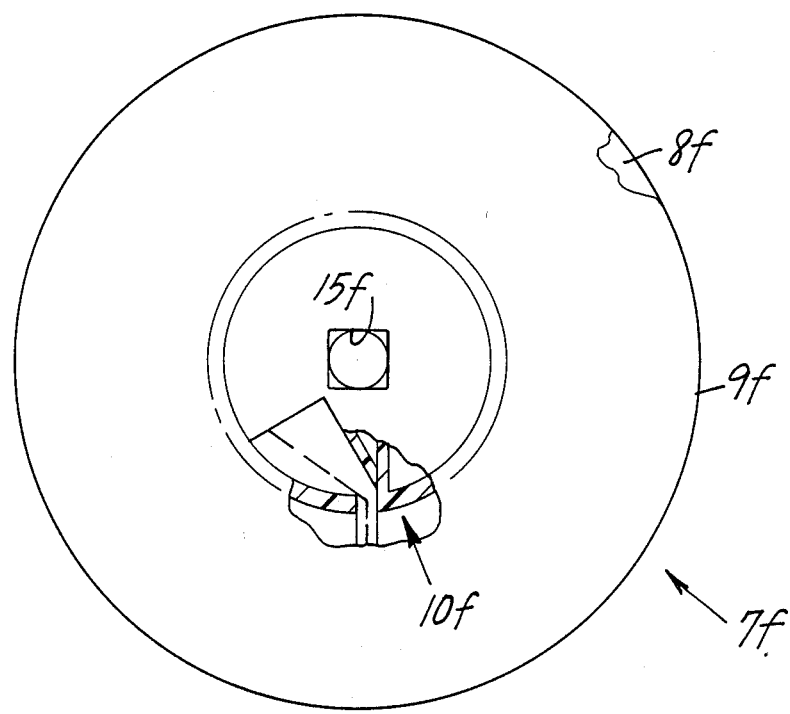

FIG. 5 diagrammatically and symbolically illustrates the shaft or spindle-driven side of another alternate reel 7f of the same general type as the forgoing figures, showing the alternate configuration of a squared spindle-mounting structure (and spindle-mounting space thereof) 15f and illustrating in partial cut-away for improved understanding, and with a partial cutaway showing the opposite side's reel flange 8f. The squared spindle-mounting structure will drivably-receive any of properly-sized conventional driving spindles having cross-section shape of squared shape or of triangular shape or of other irregular (non-round) cross-sectional shape.

Figure 5A:
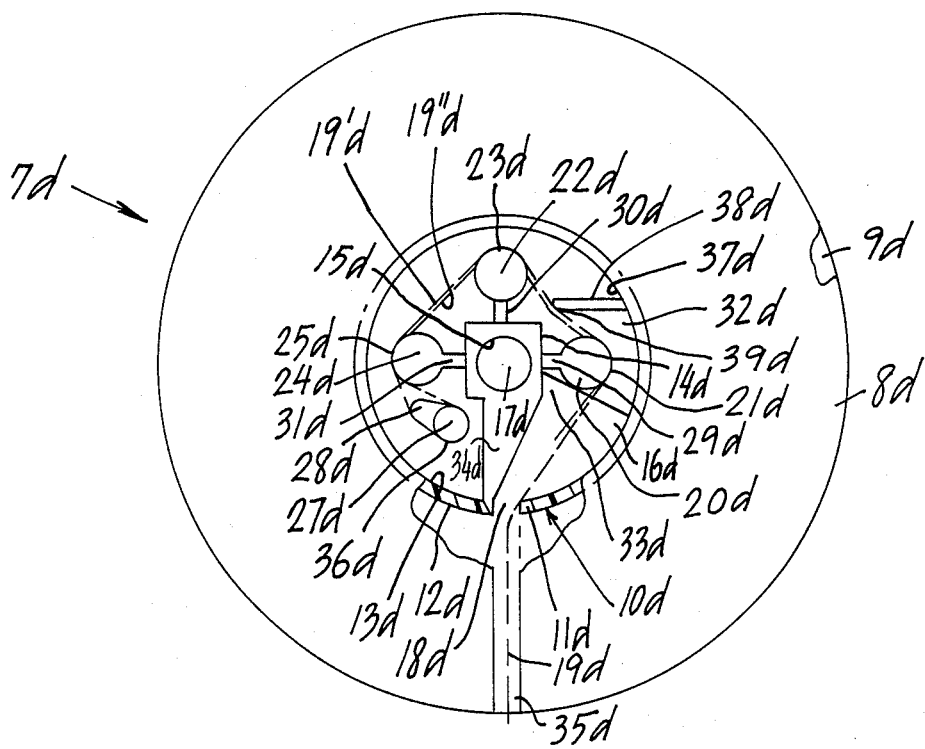

FIG. 5A diagrammatically and symbolically illustrates a threading-side of an alternate reel 7d with partial cut-away for improved understanding and with a partial cut-away showing the opposite side's reel-flange 9d, showing in phantom a threaded film or tape. The spindle-mounting structure of this embodiment has forms a squared spindle-receiving hole or cavity, thus drivable by a spindle devoid of a radially-extending key-receiving structure (and space thereof) of the type illustrated in FIG. 1. This alternate illustrated reel 7d has an opposite side identical to that shown in FIG. 5. This embodiment includes a single angularly-extending radially-inwardly film-contacting flange 37d positioned between the first and second sequentially-arranged radially outwardly-extending wall structures 29d and 39d, and their respective enlarged rounded distal ends 20d and 22d thereof, positioned within the reel-flange film-threading space 16d.

Figure 5B:
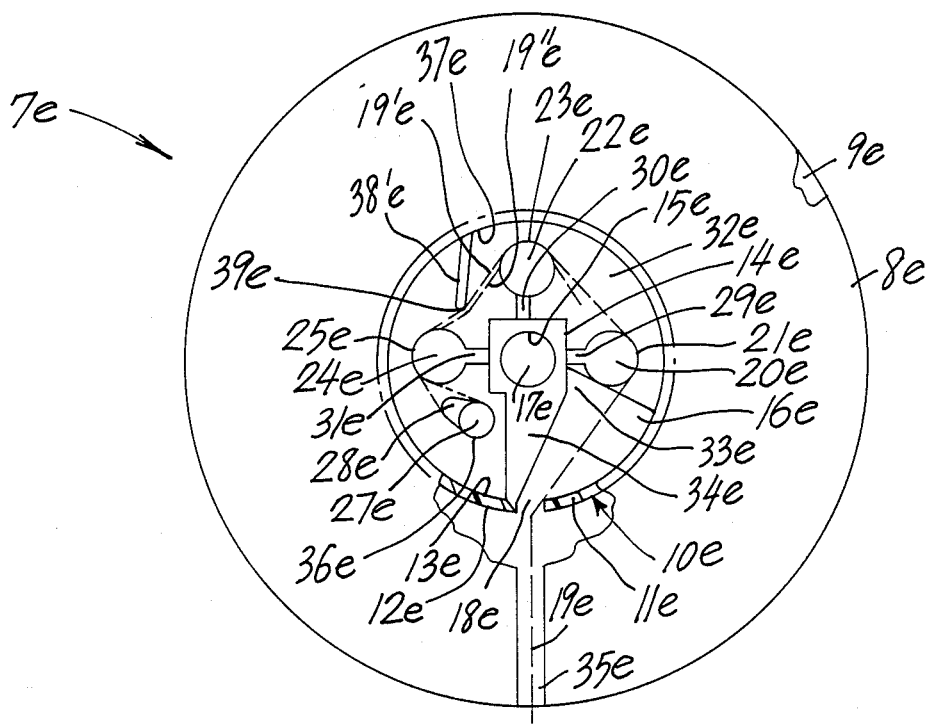

FIG. 5B diagrammatically and symbolically illustrates an embodiment different from that of FIG. 5A, and illustrates a threading-side of an alternate reel 7e with partial cut-away for improved understanding and with a partial cut-away showing the opposite side's reel-flange 9e, showing in phantom a threaded film or tape 19e. The spindle-mounting structure 15e of this embodiment has forms a squared spindle-receiving hole or cavity, thus drivable by a spindle either with or devoid of a radially-extending key-receiving structure (and space thereof) of the type illustrated in FIG. 1 if the keyless spindle is of a cross-sectional shape that is squared or triangular or otherwise irregular (non-round) and of proper size. This alternate illustrated reel 7e has an opposite side identical to that shown in FIG. 5. This embodiment includes a single angularly-extending radially-inwardly film-contacting flange 38'e positioned between the second and third sequentially-arranged radially outwardly-extending wall structures 30 and 31 and between their respective enlarged rounded distal ends 22 and 24 thereof, positioned within the reel-flange film-threading space 16e.

Prior reference to a properly sized spindle to fit a particular spindle-receiving space of a spindle and/or key-receiving structure, refers simply to the cross-sectional size of the particular reel-driving spindle and/or of a key extending radially-outwardly from its outer rounded surface. Obviously if an irregularly shaped spindle is too small, it will not wedge into and drive a squared or triangularly-shaped or hexagonally-shaped hole-defining structure and accordingly in such case will not drive the reel. However, if sufficiently large, an irregularly-shaped cross-section of a driving spindle will wedge into and drive a reel's spindle-drive receiving structure (and thus drive the reel) of a squared or triangular or hexagonal or other irregular shape.

It is within the scope and spirit of this invention, to make such variations and substitution of equivalents, as are apparent to a person of ordinary skill in this art.

I claim:

1. In a film reel having an upper face and an opposite-side lower face, in combination having a film-threadable film-retaining core (a) that has an outer collar with an outer radially-inwardly positioned wall-surface and with an outer radially-outwardly positioned wall-surface, (b) that has an inner collar with an inner collar radially-inwardly positioned wall-surface, defining a film-threading space between said outside collar's inside wall surface and said inner collar radially-outwardly positioned wall surface, (c) that has a collar's-anchoring floor connecting with at-least a major portion of each of the inner collar radially-outwardly positioned wall-surface and the outer collar radially-inwardly positioned wall-surface, (d) that has a radially extending core-anchoring wall radially-extending between and connecting-together said inner and outer collars, (e) a film-threading space extending from an open slot that extends-radially through said outside collar, and (f) the film-threading space extending from an open slot that extends-radially through said outside collar, the film-threading space. extending substantially around said inside collar to terminate at said core-anchoring wall, (g) said inner collar radially-inwardly positioned wall surface being a spindle-receptacle structure forming spindle-receiving space of said opposite lower face, (h) said inner collar radially outwardly-positioned wall-surface including a plurality of wall structures each extending radially outwardly a predetermined distance to end as a wall structure distal-end defining a film-threading gap between said wall structure distal-end and said outer collar's radially-inwardly extending wall-surface; and (i) film-anchoring post means for reversing direction, said film-anchoring post means being located within said film-threading space extending upwardly from said collar's-anchoring floor, and said film-anchoring post means being positioned and spaced-away-from each of said core-anchoring wall, the inner collar radially-outwardly positioned wall surface and the radially-inwardly positioned wall surface, the improvement being in said core additionally as a part of said combination comprising: at-least one flange mounted on and extending radially inwardly from said outer collar radially-inwardly positioned wall-surface, said one flange having a flange distal end, said flange being mounted at a location and extending in a direction such that said distal end is positioned within said film-threading space and is positioned between and in spaced-away relationship to adjacent ones of two of said plurality of wall structures, and said one flange extending radially inwardly a distance sufficiently to press against a film tautly threaded between said adjacent ones of said plurality of wall structures when a film is threaded within said threading space.

2. The improvement according to claim 1, in which said flange extends at an angle of less than 90 degrees in a counter-clockwise direction such that said flange distal end is directed in a direction of threading toward said film-anchoring post means and in a direction of threading directed away from said radially-extending space of said outside collar.

3. The improvement according to claim 2, in which said plurality of wall structures includes at-least first, second and third radially-extending wall structures, and in which at least one of said flanges is mounted at at-least a location positioned between said second and said third radially-extending wall structures.

4. The improvement according to claim 3, including at-least a second one of said flanges having a second distal end, said second one extending radially inwardly into said threading space with said second distal end positioned between said first and said second radially-extending wall structures, extending radially inwardly a distance to press against a tautly-threaded film within said threading space when a film is threaded within the threading space.

* * * * *